United States Patent [19]

Lee et al.

[11] 4,420,818

[45] Dec. 13, 1983

[54] FAST LOAD CASSETTE TAPE RECORDER INTERFACE

[75] Inventors: Lester H. Lee, Los Altos; George Wussow, San Jose, both of Calif.

[73] Assignee: Recortec, Inc., Mountain View, Calif.

[21] Appl. No.: 243,078

[22] Filed: Mar. 12, 1981

[51] Int. Cl.³ .............................................. G06F 3/00
[52] U.S. Cl. .................................................. 364/900
[58] Field of Search ............................. 364/200, 900

[56] References Cited

U.S. PATENT DOCUMENTS

| | | | |
|---|---|---|---|
| 3,760,375 | 9/1973 | Irwin et al. | 364/200 |
| 4,024,505 | 5/1977 | Sperling | 364/200 |
| 4,051,459 | 9/1977 | Steranko et al. | 364/900 |
| 4,112,501 | 9/1978 | Onnestam | 364/900 |
| 4,213,189 | 7/1980 | Mueller et al. | 364/900 |

Primary Examiner—Jerry Smith
Assistant Examiner—Mark P. Watson
Attorney, Agent, or Firm—Thomas E. Schatzel

[57] ABSTRACT

A cassette tape recorder interface for high speed loading into a computer of data stored on cassette tapes. The interface receives signals from a cassette tape recorder modified to have the play head engaged while in the fast forward wind mode. The interface includes a comparator, a separator for separating clock and data pulses, a serial-to-parallel converter, control logic, and interface program memory.

9 Claims, 12 Drawing Figures

Fig-3

Fig_5

Fig_4

Fig. 6

Fig_7(A)

Fig_7(B)

Fig_7(C)

Fig_7(D)

Fig_7(E)

Fig_8

FAST LOAD CASSETTE TAPE RECORDER INTERFACE

BACKGROUND OF THE INVENTION

1. Field of the Invention

The invention relates generally to cassette tape recorder interfaces for high-speed loading of cassette tape program data into a computer and more particularly to a cassette tape recorder interface which does not require any change in data format.

2. Description of the Prior Art

Computer programs are often stored on a magnetic media such as cassette tapes or floppy disks. When a user desires to run the program on a computer, the user reads the program from the magnetic media. The prgram is then read into the computer random access memory.

Many computers designed for the home or consumer markets include cassette tape recorders for storage of computer programs. Cassette tape recorders are less expensive than floppy disks but also load data much slower.

SUMMARY OF THE PRESENT INVENTION

It is therefore an object of the present invention to provide a cassette tape recorder interface capable of reading data from a cassette tape at a high speed.

It is a further object to provide a cassette tape recorder interface which does not require a change in data format.

It is a further object to provide a cassette tape recorder interface which provides reliable loading of data into a computer.

Briefly, a preferred embodiment of the present invention includes a comparator responsive to electrical signals from a cassette tape recorder for generating data and clock pulses. A separator is connected to the comparator and generates seaprated clock pulses and data pulses. The clock pulses and data pulses are then fed to a serial-to-parallel converter which receives serial data pulses and transmits parallel data to a computer through a data bus interface. The cassette tape recorder interface also includes memory for storing the software required for interface to the computer. Finally, the cassette tape recorder interface includes a program start detector and control logic.

An advantage of the cassette tape recorder interface of the present invention is that data may be loaded into the computer at high speeds.

Another advantage is that the cassette tape recorder interface does not require a change in data format.

A further advantage is that the cassette tape recorder interface provides reliable loading of data into the computer.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
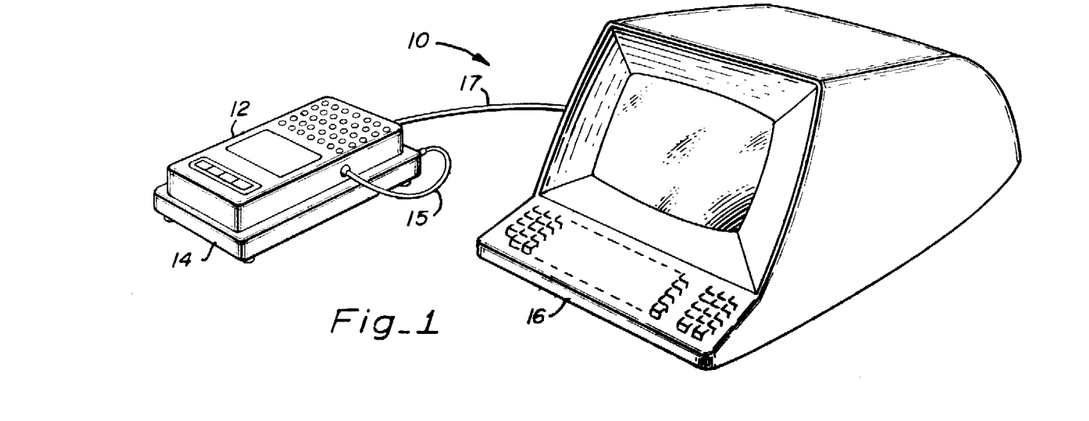
FIG. 1 is a perspective view of a cassette tape recorder interface in accordance with the present invention and connected to a cassette tape recorder and computer.

In FIG. 1, there is illustrated a computer system referred to by the general reference character 10 and incorporating the present invention. The computer system 10 includes a cassette tape recorder 12, connected to a cassette tape recorder interface 14 by a cable 15. The interface 14 is connected to a general purpose computer 16 by a ribbon cable 17. In the preferred embodiment, the cassette tape recorder interface 14 is designed to interface to a Radio Shack TRS-80 computer. The cassette tape recorder 12 may comprise a Radio Shack CTR-41 cassette recorder modified to have the play head engaged while the fast forward wind mode.

Figure 2:
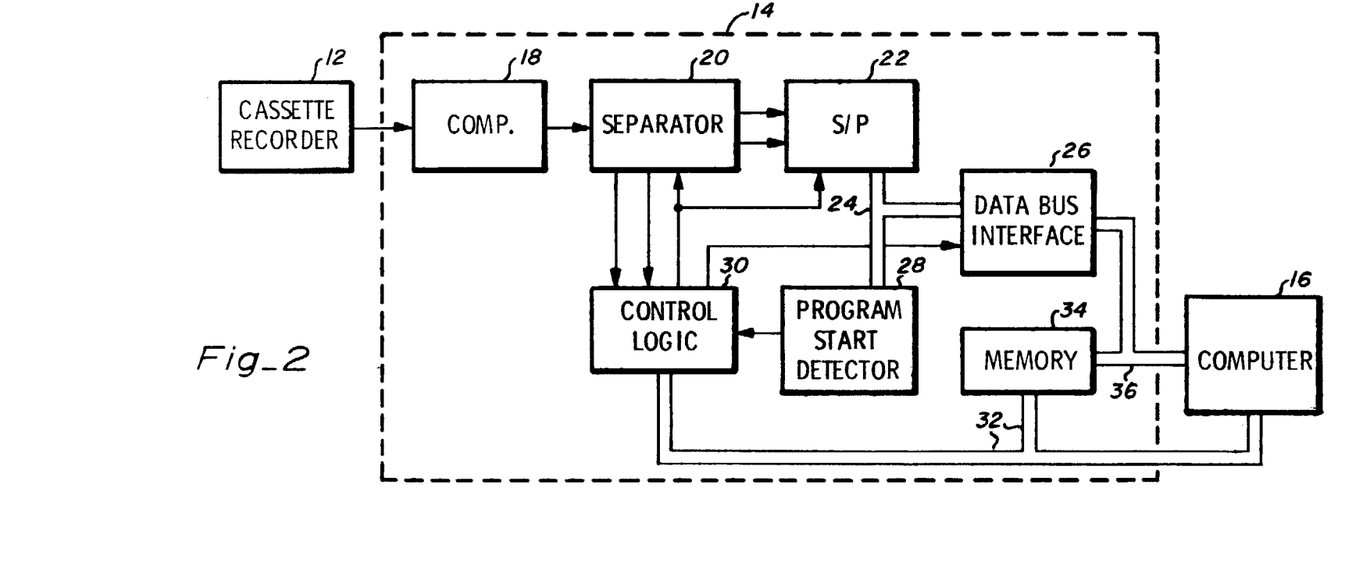
FIG. 2 is a block diagram of the cassette tape recorder interface of FIG. 1.

FIG. 2 is a block diagram of the cassette tape recorder interface 14. The cassette tape recorder interface 14 includes a comparator 18 which receives an input from the cassette recorder 12 and has its output connected to a separator 20. The separator 20 has two outputs connected to a serial-to-parallel converter 22. Parallel bits of data are output from the serial-to-parallel converter 22 on a data bus 24. The parallel data from the serial to parallel converter 22 is fed to a data bus interface 26 and a program start detector 28 via the data bus 24.

The cassette tape recorder interface 14 also includes a control logic block 30. The control logic 30 receives two inputs from the separator 20 and an input from the program start detector 28. The control logic 30 also receives address signals from the computer 16 via an address bus 32. An output from the control logic 30 is fed to the separator 20 and the serial-to-parallel converter 22. The control logic 30 also has a plurality of outputs fed to the data bus interface 26.

The cassette tape recorder interface 14 also includes a memory block 34 which is connected to the address bus 32 and also connected to a data bus 36. The data bus 36 is connected to the computer 16 and also connected to the data bus interface 26.

Figure 3:
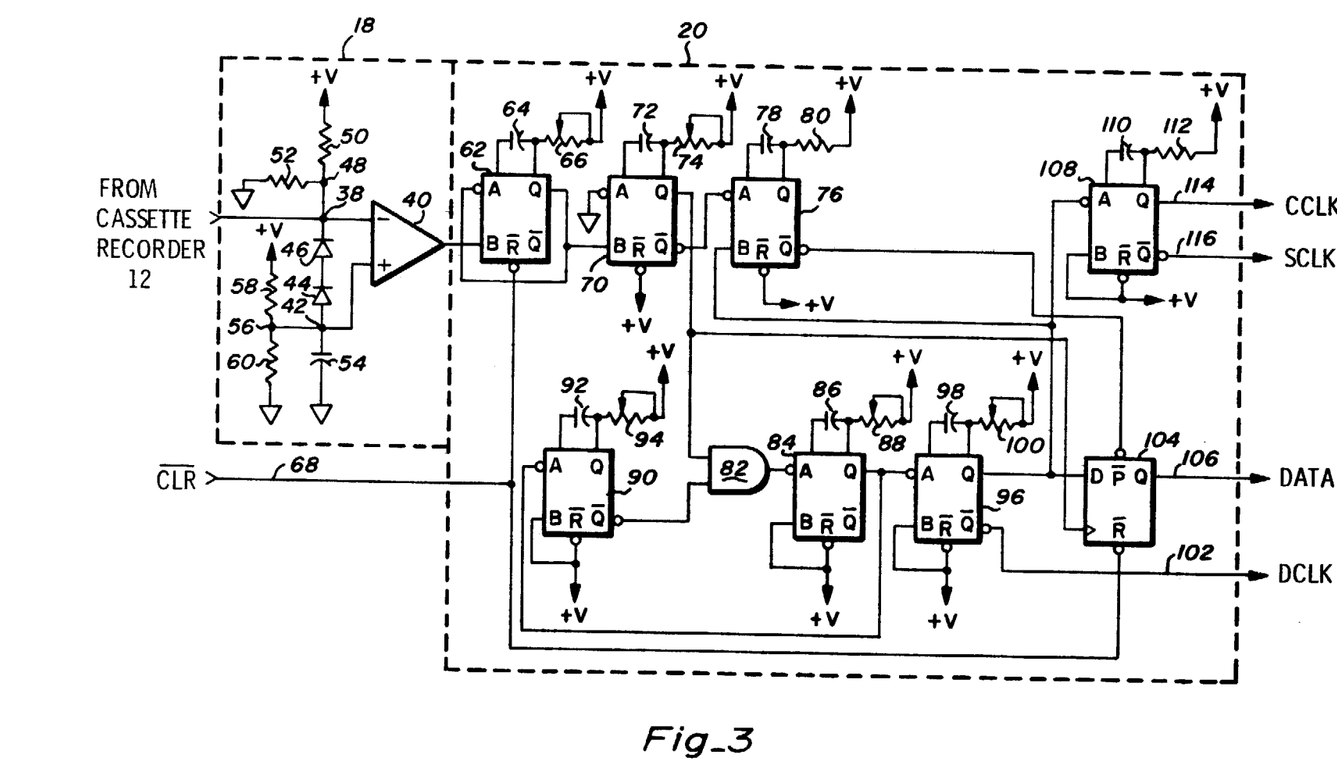
FIG. 3 is a circuit diagram of the comparator and separator of FIG. 2.

FIG. 3 is a circuit diagram of the comparator 18 and the separator 20. The signal from the cassette recorder 12 is fed to a terminal 38 which is connected to the inverting input of a voltage comparator 40. The non-inverting input of the voltage comparator 40 is connected to a terminal 42. Terminal 42 is connected to the input of a diode 44 and the output of the diode 44 is connected to the input of the diode 46 which has its output connected to the terminal 38. The terminal 38 is connected to a terminal 48 which is conneted to a resistor 50 and a resistor 52. The resistor 50 is also connected to a positive voltage source +V and the resistor 52 is also connected to ground potential. The terminal 42 is connected through a capacitor 54 to ground potential.

The terminal 42 is also connected to a terminal 56 which is connected to a resistor 58 and a resistor 60. The resistor 58 is also connected to a voltage potential +V and the resistor 60 is also connected to ground potential.

The output of the voltage comparator 40 is fed to the separator 20 and is connected to the B input of a one-shot device 62. A capacitor 64 is connected across two inputs of the one-shot device 62. The capacitor 64 is also connected through a variable resistor 66 to the voltage potential +V. A clear signal 68 is connected to the R input of the one-shot device 62. The Q output of the one-shot device 62 is connected to the A input of the one-shot device 62.

The Q output of the one-shot device 62 is also connected to the B input of a one-shot device 70. The one-shot device 70 has a capacitor 72 connected across two inputs. The capacitor 72 is connected through a variable resistor 74 to the voltage potential +V. The A input of the one-shot 70 is connected to ground potential, and the R input is connected to the voltage potential +V.

The inverted Q output of the one-shot 70 is connected to the A input of a one-shot device 76. A capacitor 78 is connected across two inputs of the one-shot 76. The capacitor 78 is connected through a resistor 80 to the voltage potential +V. The R input of the one-shot 76 is connected to the voltage potential +V.

The separator 20 also includes an AND gate 82 which receives one of its inputs from the Q output of the one-shot 70. The output of the AND gate 82 is connected to the A input of a one-shot device 84. A capacitor 86 is conected across two inputs of the one-shot 84. The capacitor 86 is connected through a variable resistor 88 to the voltage potential +V. The B and R̄ inputs of the one-shot 84 are connected to the voltage potential +V.

The Q output of the one-shot 84 is connected to the A input of a one-shot device 90. A capacitor 92 is connected across two inputs of the one-shot 90. The capacitor 92 is connected through a variable resistor 94 to the voltage potential +V. The B and R̄ inputs of the one-shot 90 are connected to the voltage potential +V. The inverted Q̄ output of the one-shot 90 is connected to the other input of the AND gate 82.

The Q output of the one-shot 84 is also connected to a one-shot device 96. A capacitor 98 is connected across two inputs of the one-shot 96. The capacitor 98 is connected through a variable resistor 100 to the voltage potential +V. The B and R̄ inputs of the one-shot 96 are also connected to the voltage potential +V. The Q̄ output of the one-shot 96 is a clock signal 102. The Q output of the one-shot 96 is connected to the B input of the one-shot 76.

The Q output of the one-shot 96 is also connected to the D input of a flip-flop 104. The Q̄ output of the one-shot 70 is connected to the clock input of the flip-flop 104, the Q output of the one-shot 76 is connected to the P input of the flip-flop 104, and the clear signal 68 is connected to the R̄ input of the flip-flop 104. The Q output of the flip-flop 104 is a data signal 106.

The Q output of the one-shot 96 is also connected to the A input of a one-shot device 108. A capacitor 110 is connected across two inputs of the one-shot 108. The capacitor 110 is also connected through a resistor 112 to the voltage potential +V. The B and R inputs of the one-shot 108 are also connected to the voltage potential +V. The Q output of the one-shot 108 is the clocked signal 114 and the inverted Q output of the one-shot 108 is the clock signal 116.

Figure 4:
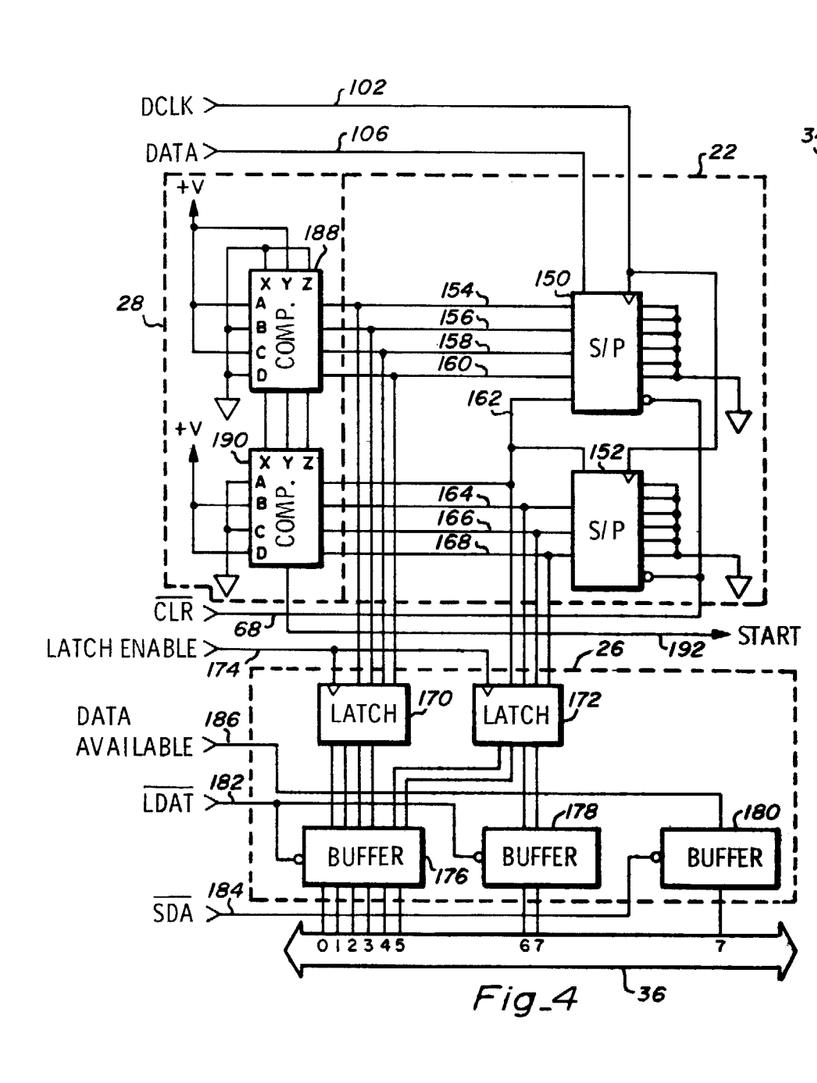
FIG. 4 is a circuit diagram of the serial to parallel converter, the program start detector, and the data bus interface of FIG. 2.

FIG. 4 is a circuit diagram of the serial-to-parallel converter 22, the data bus interface 26, and the program start detector 28. The serial to parallel converter 22 includes a serial to parallel converter chip 150 and a serial to parallel converter chip 152. The serial to parallel converter chip 150 receives the clock siganl 102 and the data signal 106. The serial to parallel converter chip 152 also receives the clock signal 102. Both serial to parallel converter chips 150 and 152 receive the clear signal 68 and each have 6 inputs connected to ground potential. The serial to parallel converter chip 150 has 5 data outputs referred to by the reference numerals 154, 156, 158, 160, and 162. The data output 162 is fed to the data input of the serial to parallel converter chip 152. The serial to parallel converter chip 152 has 3 data outputs referred to by the reference numerals 164, 166, and 168. The data outputs 154, 156, 158, 160, 162, 164, 166, and 168 comprise the data bus 24.

The data bus interface 26 includes a latch 170 and a latch 172. The latches 170 and 172 receive a latch enable signal 174. The latch 170 receives the data outpus 154, 156, 158, and 160. The latch 172 receives the data outputs 162, 164, 166, and 168.

The data bus interface 26 also includes a buffer 176, a buffer 178, and a buffer 180. The buffers 176 and 178 receive a load data signal 182. The buffer 180 receives a set data available signal 184. The buffer 176 receives the 4 outputs from the latch 170 and 2 outputs from the latch 172. The buffer 178 receives the remaining two outputs from the latch 172. A data available signal 186 is connected to the input of the buffer 180. The outputs of the buffers 176, 178, and 180 are connected to the data bus 36, which comprises 8 parallel data lines. The outputs of the buffer 176 are connected to the 6 least significant data lines, and the outputs of the buffer 178 are connected to the 2 most signifcant data lines. The buffer 180 has a single output connected to the most significant data line of the data bus 36.

The program start detector 28 includes a comparator chip 188 and a comparator chip 190. The comparator chip 188 receives the data outputs 154, 156, 158, and 160 and also has A, C, and Y inputs connected to the voltage potential +V. The B, D, X, and Z inputs are connected to ground potential. The comparator chip 190 receives the data outputs 162, 164, 166, and 168 and receives X, Y and Z inputs from the comparator chip 188. The A and C inputs of the comparator chip 190 are connected to ground potential, and the B and D inputs are connected to the voltage potential +V. The comparator 190 generates a start signal 192.

Figure 5:
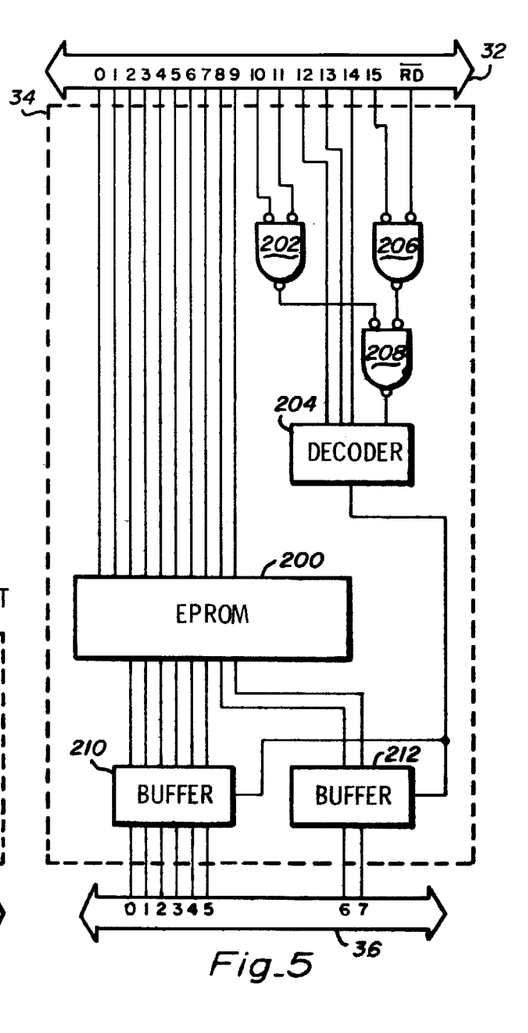
FIG. 5 is a circuit diagram of the memory of FIG. 2.

FIG. 5 is a circuit diagram of the memory 34. The memory 34 includes an erasable programable read-only memory (EPROM) 200. The EPROM 200 has 10 address inputs connected to the address bus 32. The address bus 32 comprises 16 address lines plus a read line. Address lines 0 through 9 are connected to the EPROM 200. Address lines 10 and 11 are connected to inverted inputs of a NAND gate 202. Address lines 12, 13 and 14 are connected to a decoder 204. Address line 15 and the read line are connected to inverted inputs of a NAND gate 206. The output of the NAND gate 202 and the output of the NAND gate 206 are connected to inverted inputs of a NAND gate 208. The output of the NAND gate 208 is connected to the decoder 204. The output of the decoder 204 is connected to a buffer 210 and a buffer 212. The EPROM 200 has 8 data outputs of which the 6 least significant data outputs are connected to the buffer 210 and the two most sigificant data outputs are connected to the buffer 212. The buffer 210 has 6 outputs connected to the data bus 36, and the buffer 212 has 2 outputs connected to the data bus 36.

Figure 6:
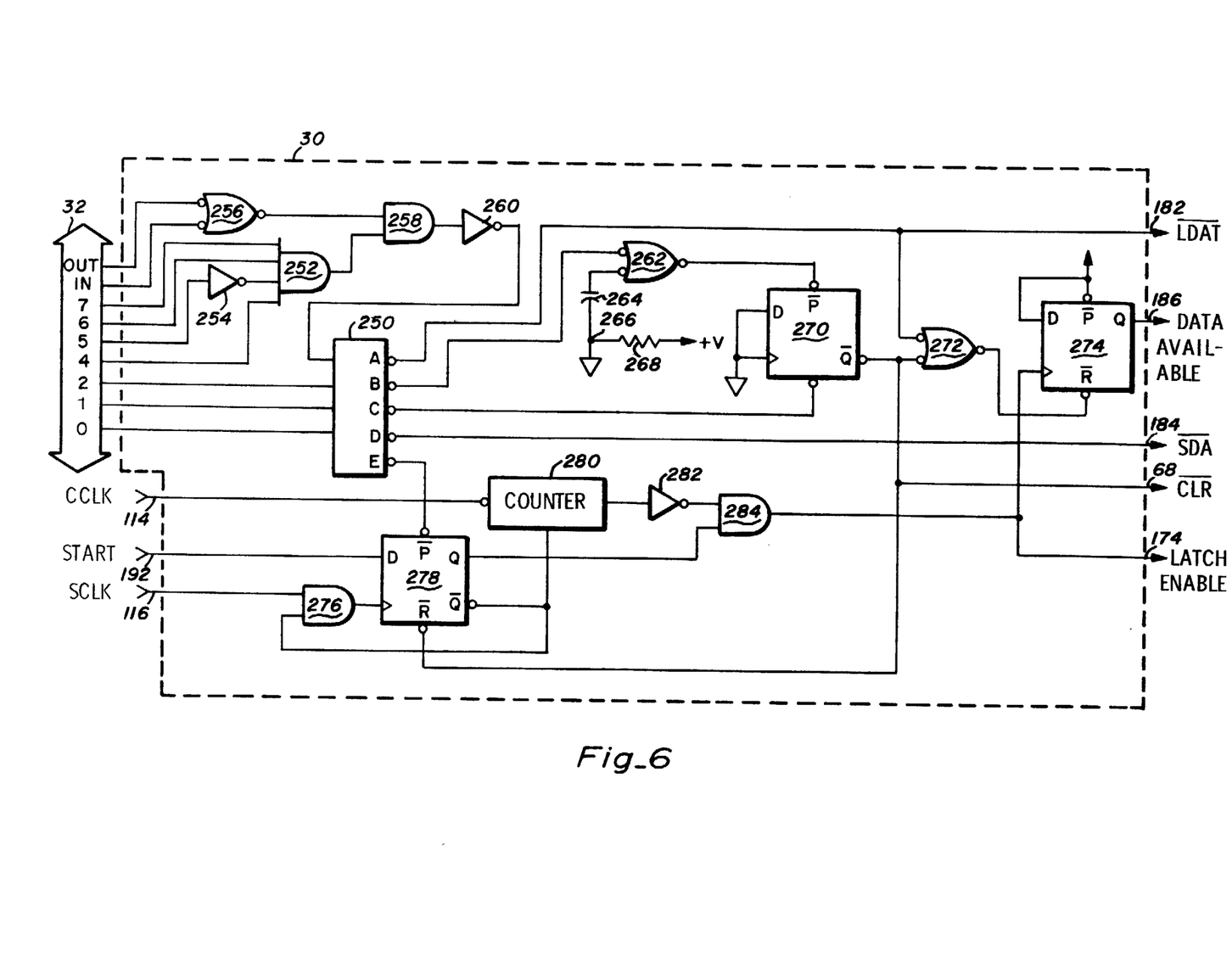
FIG. 6 is a circuit diagram of the control logic of FIG. 2.

FIG. 6 is a circuit diagram of the control logic 30. The control logic 30 includes a decoder 250 having 3 inputs from data lines 0, 1, and 2 of the data bus 32. The control logic 30 also includes a 4-input NAND gate 252 having data lines 4, 6, and 7 connected to 3 of the inputs. Data line 5 of the data bus 32 is connected to an inverter 254 having its output connected to the fourth input of the NAND gate 252. The data bus 32 also includes an IN line and an OUT line which are connected to inverted inputs of a NOR gate 256. The output of the NAND gate 252 and the output of the NOR gate 256 are connected to the inputs of an AND gate 258. The output of the AND gate 258 is connected to an inverter 260 having its output connected to the decoder 250.

An output from the decoder 250 is the load data signal 182. Another output of the decoder 250 is connected to an inverted input of a NOR gate 262. A capacitor 264 is connected to the other inverted input of the NOR gate 262. The capacitor 264 is also connected to a terminal 266 which is connected to ground potential. A resistor 268 is connected to the terminal 266 and the voltage potential +V.

The output of the NOR gate 262 is connected to the P input of a flip-flop 270. The flip-flop 270 has its D and clock inputs connected to ground potential and the R input is received from the decoder 250.

The inverted Q output of the flip-flop 270 is connected to an inverted input of a NOR gate 272. The other inverting input of the NOR gate 272 is the load data signal 182 from the decoder 250. The output of the NOR gate 272 is connected to the R input of a flip-flop 274. The P and D inputs of the flip-flop 274 are connected to the voltage potential +V. The Q outputs of the flip-flop 274 is the data available signal 186.

The set data available signal 184 is an output from the decoder 250. The clear signal 68 is the inverted Q output of the flip-flop 270.

The control logic 30 also includes an AND gate 276 which receives the clock signal 116. The other input of the AND gate 276 is received from the inverted Q output of a flip-flop 278. An output of the decoder 250 is connected to the P input of the flip-flop 278 and the start signal 192 is connected to the D input. The output of the AND gate 276 is connected to the clock input of the flip-flop 278, and the clear signal 68 is connected to the R input. The inverted Q output of the flip-flop 278 is connected to a counter 280.

The counter 280 receives the clock signal 114 and has an output connected to an inverter 282. An AND gate 284 receives the output of the inverter 282 and also the Q output of the flip-flop 278. The output of the AND gate 284 is the latch enable signal 174 and is connected to the clock input of the flip-flop 274.

FIG. 7 illustrates various parts of the cassette tape recorder 12 which needs to be modified so that the play head will be engaged in the fast forward wind mode. The cassette tape recorder 12 includes a switch interlock bar 300. A play tab 302 and a fast forward tab 304 need to be modified. FIG. 7B is a side view of the play tab 302 before it is modified. FIG. 7C illustrates that play tab 302 after it has been modified by bending the end of the tab up and back. After adjustment of the play tab it may be necessary to adjust the head penetration. In order to determine if adjustment of the head penetration is necessary, the cassette tape recorder 12 must be reassembled and its operation observed. Excessive head penetration will cause a jerky movement of the tape. Insufficient head penetration will cause data drop-outs. FIG. 7D illustrates the fast forward tab 304. To increase head penetration the end of the tab is bent towards the dashed line A. To decrease head penetration the end of the tab is bent towards line B. Thus, if the tape movement is jerky, the end of the tab is bent towards the dashed line B and if data drop-outs are occurring the end of the tab is bent towards the dashed line A.

Figure 7A:
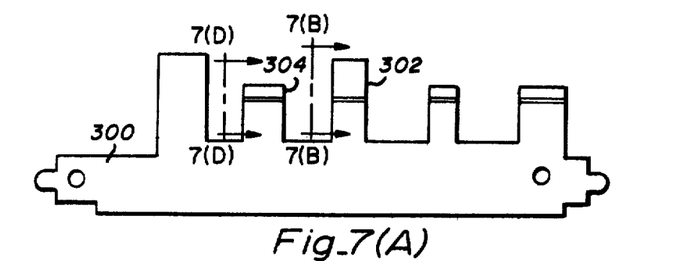
FIGS. 7(A)-(E) are elevational views of various parts of the cassette tape recorder of FIG. 1.
Figure 7B:
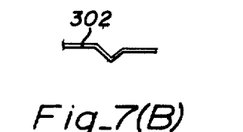
Figure 7C:
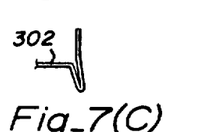
Figure 7D:
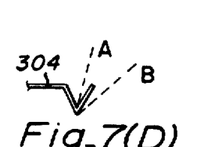
Figure 7E:
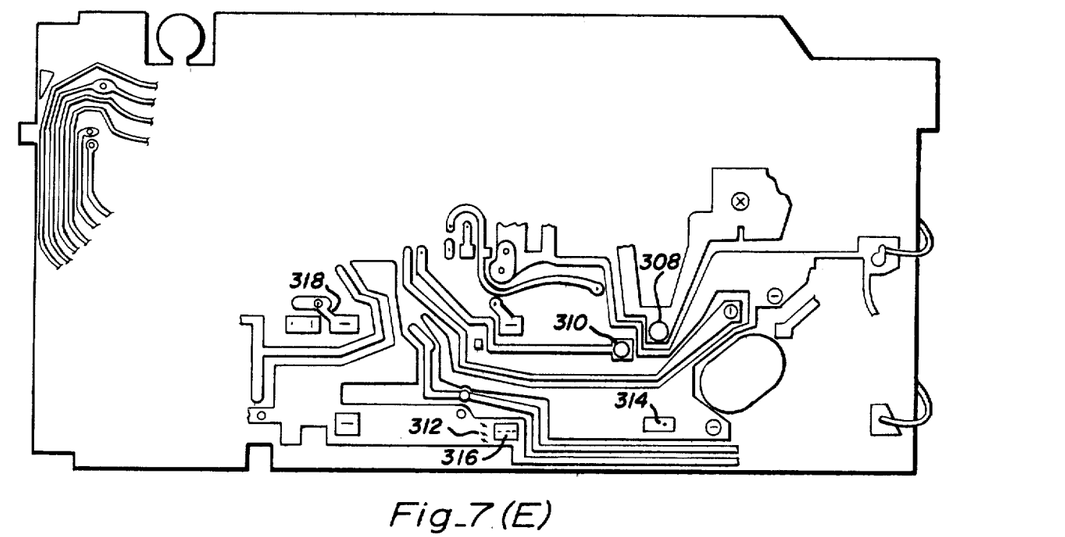

FIG. 7E illustrates a printed circuit board 306 of the cassette tape recorder 12. The printed circuit board 306 is modified by installing a 47 ohm resistor between a point 308 and a point 310. Next, a wide trace is cut in the printed circuit board 306 at the point 312. A wire is connected between a point 314 and a point 316. In the preferred embodiment, it is recommended that the wire be 22 gauge. The built-in microphone may be disabled by cutting a trace at a point 318. However, disabling the built-in microphone is optional. With these modifications the play head of the cassette tape recorder 12 will be engaged in the fast forward wind mode.

Table 1 is a listing of the program stored in the EPROM 200.

TABLE 1

| | | |
|---|---|---|
| JMEM | EQU | 4189H |
| | ORG | 3000H |
| INIT | OUT | (0D1H),A |
| | LD | HL,START |
| | LD | (JMEM),HL |
| | JP | 06CCH |
| START | XOR | A |
| | LD | (409CH),A |
| | LD | (403DH),A |
| | OUT | (0D1H),A |
| | LD | SP,4288H |
| | CALL | 01C9H |
| | LD | HL,PRMPT |
| | CALL | 28A7H |
| ST1 | CALL | 49H |
| | CP | 01 |
| | JP | Z,BEXIT |
| | CP | 53H |
| | JR | Z,SYS |
| | CP | 42H |
| | JR | NZ,ST1 |
| | CALL | 01C9H |
| | LD | HL,NRMPT |
| | CALL | 28A7H |
| | CALL | 49H |
| | CP | 01 |
| | JP | Z,BEXIT |
| | CP | 0DH |
| | LD | HL,(4020H) |
| | JR | Z,NBN |
| | INC | HL |
| | LD | (HL),A |
| | JR | BN |
| NBN | XOR | A |
| BN | LD | (4290H),A |
| | LD | HL,3C40H |
| | LD | (4020H),HL |
| | LD | HL,GRMPT |
| | CALL | 28A7H |
| SPM | LD | HL,4290H |
| | CALL | GZ |
| LB3 | LD | B,03 |
| | CALL | GCHAR |
| LB | CALL | GCHAR |
| | CP | 0D3H |
| | JR | NZ,GNP |
| | DJNZ | LB |
| | CALL | GCHAR |
| | LD | B,A |
| | LD | A,(4290H) |
| | OR | A |
| | LD | A,B |

TABLE 1-continued

|       | JR    | Z,OPN       |
|-------|-------|-------------|
|       | CP    | (HL)        |
| OPN   | LD    | (3C3AH),A   |
|       | JR    | NZ,GNP      |
|       | LD    | HL,(40A4H)  |
| LBP   | LD    | B,03        |
| LPB1  | CALL  | GCHAR       |
|       | LD    | (HL),A      |
|       | INC   | HL          |
|       | OR    | A           |
|       | JR    | NZ,LBP      |
|       | DJNZ  | LPB1        |
|       | JP    | ABEXIT      |
| GNP   | CALL  | GZ1         |
|       | LD    | HL,4290H    |
|       | JR    | LB3         |
| SYS   | CALL  | 01C9H       |
|       | LD    | HL,SRMPT    |
|       | CALL  | 28A7H       |
|       | CALL  | 1BB3H       |
|       | JP    | C,BEXIT     |
|       | RST   | 10H         |
|       | PUSH  | AF          |
|       | PUSH  | HL          |
|       | LD    | HL,3C40H    |
|       | LD    | (4020H),HL  |
|       | LD    | HL,GRMPT    |
|       | CALL  | 28A7H       |
|       | CALL  | GZ          |
| RNEW  | LD    | DE,3C30H    |
|       | CALL  | GCHAR       |
| SYS1  | CALL  | GCHAR       |
|       | CP    | 55H         |
|       | JP    | NZ,NEWP     |
|       | LD    | B,06        |
|       | POP   | HL          |
|       | POP   | AF          |
|       | PUSH  | AF          |
|       | PUSH  | HL          |
|       | JP    | NZ,GNAM     |
| SYS2  | CALL  | GCHAR       |
|       | LD    | (DE),A      |
|       | INC   | DE          |
|       | DJNZ  | SYS2        |
| SYS3  | CALL  | GCHAR       |
|       | CP    | 78H         |
|       | JR    | Z,SEND      |
|       | CP    | 3CH         |
|       | JR    | NZ,SYS3     |
|       | CALL  | GCHAR       |
|       | LD    | B,A         |
|       | CALL  | GCHAR       |
|       | LD    | L,A         |
|       | CALL  | GCHAR       |
|       | LD    | H,A         |
|       | ADD   | A,L         |
|       | LD    | C,A         |
| LDAT  | CALL  | GCHAR       |
|       | LD    | (HL),A      |
|       | INC   | HL          |
|       | ADD   | A,C         |
|       | LD    | C,A         |
|       | DJNZ  | LDAT        |
|       | CALL  | GCHAR       |
|       | CP    | C           |
|       | JR    | Z,SYS3      |
|       | CALL  | 01C9H       |
|       | LD    | HL,CKER     |
|       | CALL  | 28A7H       |
| LCKE  | CALL  | 49H         |
|       | CP    | 01          |
|       | JR    | NZ,LCKE     |
|       | JR    | BEXIT       |
| ABEXIT| LD    | (40F9H),HL  |
|       | LD    | DE,(40A4H)  |
|       | CALL  | 1AFCH       |
|       | CALL  | 1B5DH       |
| BEXIT | OUT   | (0D1H),A    |
|       | CALL  | 01C9H       |
|       | JP    | 06CCH       |
| SEND  | CALL  | GCHAR       |
|       | LD    | L,A         |

TABLE 1-continued

|        | CALL  | GCHAR                      |
|--------|-------|----------------------------|
|        | LD    | H,A                        |
|        | OUT   | (0D1H),A                   |
|        | LD    | (40DFH),HL                 |
|        | CALL  | 01C9H                      |
|        | JP    | 02B5H                      |
| GCHAR  | IN    | A,(0D3H)                   |
|        | OR    | A                          |
|        | JP    | M,GCHAR1                   |
|        | LD    | A,(3840H)                  |
|        | CP    | 04                         |
|        | JR    | NZ,GCHAR                   |
|        | JR    | BEXIT                      |
| GCHAR1 | IN    | A,(0D0H)                   |
|        | RET   |                            |
| PRMPT  | DEFM  | 'BASIC (B) OR SYSTEM (S) TAPE?' |
|        | DEFB  | 00                         |
| GRMPT  | DEFM  | 'PRESS PLAY & FFWD ON TAPE DECK' |
|        | DEFB  | 00                         |
| CKER   | DEFM  | 'CHECKSUM ERROR (BREAK)'   |
|        | DEFB  | 00                         |
| NRMPT  | DEFM  | 'BASIC NAME?'              |
|        | DEFB  | 00                         |
| GNAM   | LD    | A,(HL)                     |
|        | OR    | A                          |
|        | JP    | Z,SYS3                     |
|        | CALL  | GCHAR                      |
|        | LD    | (DE),A                     |
|        | INC   | DE                         |
|        | CP    | (HL)                       |
|        | INC   | HL                         |
|        | JR    | NZ,GNAM2                   |
|        | DJNZ  | GNAM                       |
|        | JP    | SYS3                       |
| GNAM2  | DEC   | B                          |
| GNAM21 | CALL  | GCHAR                      |
|        | LD    | (DE),A                     |
|        | INC   | DE                         |
|        | DJNZ  | GNAM21                     |
| NEWP   | CALL  | GZ1                        |
|        | JP    | RNEW                       |
| GZ     | OUT   | (0D2H),A                   |
|        | OUT   | (0D4H),A                   |
| GZ1    | LD    | B,05                       |
| GZ2    | CALL  | GCHAR                      |
|        | OR    | A                          |
|        | JR    | NZ,GZ1                     |
|        | DJNZ  | GZ2                        |
|        | OUT   | (0D1H),A                   |
|        | OUT   | (0D2H),A                   |
|        | RET   |                            |
| SRMPT  | DEFM  | 'SYSTEM NAME'              |
|        | DEFB  | 00                         |

The operation of the cassette tape recorder interface 14 is believed to be as follows. Data is stored on a cassette tape by a method known as frequency modulation (FM). FM recorded data consists of uniformly spaced clock pulses where the presence of a pulse between clock pulses indicates a one, and the absence of a pulse between clock pulses indicates a zero. Referring to FIG. 2, the signal from the cassette recorder 12 is fed to the comparator 18. The comparator 18 will detect the clock and data signals and generate an output having a fixed voltage. The signal from the comparator 18 is then fed to the separator 20 which separates the clock pulses from the data pulses. The block pulses and data pulses are then fed to the serial to parallel converter 22. With each clock pulse, the data signal from the separator will be shifted through the serial to parallel converter. The control logic 30 will count clock pulses and after every 8 clock pulses will cause an enable signal to be provided to the data bus interface 26. The data bus interface 26 will then latch the data on the data bus 24.

Each program stored on the cassette type will have a header of 256 zeros followed by the hexadecimal code A5. The program start detector 28 will provide a start signal to the control logic 30 when the hexadecimal code A5 is read.

The memory 34 contains software to run the cassette tape recorder interface 14. When a command to load a program is typed into the computer 16, the program in memory 34 will be addressed. The computer 16 will read the program instructions from the memory 34 via the data bus 36. The computer 16 also reads the data stored on the cassette tape from the data bus 36. The program will cause the computer 16 to send appropriate address codes to the control logic 30 via the address bus 32. The address codes are then decoded by the control logic 30 which then sends control signals to the data bus interface 26 to permit the reading of data by the computer 16.

Referring to FIG. 3, the voltage potential at the terminal 38 differs from the voltage potential at the terminal 42 by the voltage drop across the diodes 44 and 46. This prevents noise on the cassette tape from triggering the voltage comparator 40. When the voltage at the inverting input of the voltage comparator 40 exceeds the voltage at the non-inverting input, the voltage comparator 40 will generate an output voltage. This voltage is then fed to the one-shot 62. The one-shot 62 is triggered on the low to high transition of the B input. The Q output of the one-shot 62 remains high for 47 microseconds and acts as a buffer to the one-shot 70.

Figure 8:
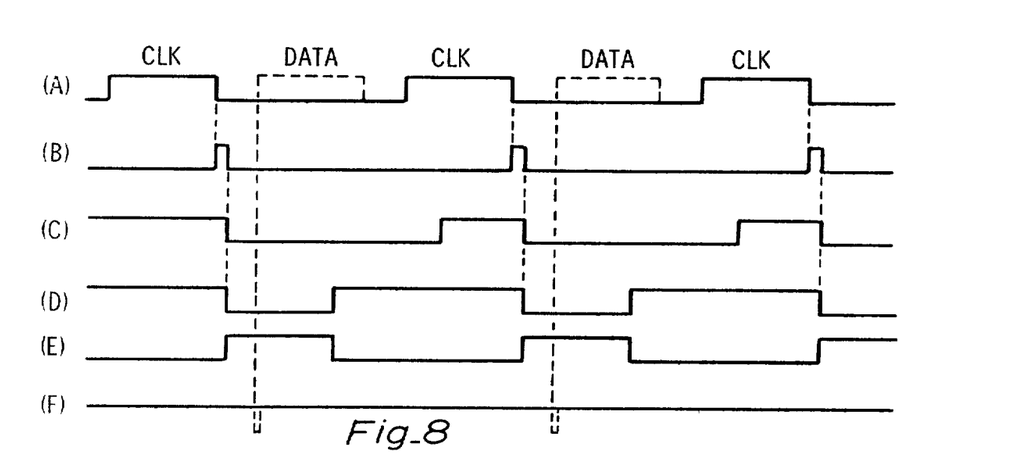
FIG. 8 is a timing chart of various signals of the separator of FIG. 3.

The one-shot 70 is triggered on the low to high transition of the Q output from the one-shot 62. Thus, it is triggered simultaneously with the one-shot 62. The Q output of the one-shot 70 will remain high or 43 microseconds and is illustrated in FIG. 8(A). The pulses indicated by dashed lines indicate data pulses which may or may not be present.

The Q output of the one-shot 70 is fed to the AND gate 82. The AND gate 82 also receives the inverted Q output of the one-shot 90. The inverted Q output of the one-shot 90 is normally high until the one-shot 90 is triggered. The one-shot 90 is triggered by the Q output of the one-shot 84. The one-shot 84 is triggered when the output of the AND gate 82 goes from high to low. Since the input to the AND gate 82 from the one-shot 90 is normally high, the one-shot 84 will be triggered on the high to low transition of the Q output from the one-shot 70 as illustrated in FIG. 8(B). The Q output of the one-shot 84 remains high for 5 microseconds.

The one-shot 90 is triggered by the high to low transition of the Q output of the one-shot 84. The inverted Q output of the one-shot 90 will remain low for 90 microseconds as illustrated in FIG. 8(C). During the time the inverted Q output of the one-shot 90 is low, the output of the AND gate 82 will remain low. Thus, the one-shot 84 cannot be triggered during this time frame. Consequently, the data pulse following the clock pulse will not trigger the one-shot 84.

The Q output of the one-shot 84 is fed to the one-shot 96 which is triggered on the high to low transition of the Q output of the one-shot 84. The inverted Q output of the one-shot 96 will remain low for 43 microseconds after the one-shot 96 has been triggered. The inverted Q output of the one-shot 96 is the clock signal 102 and is illustrated in FIG. 8(D). The Q output of the one-shot 96 goes high for 43 microseconds when the one-shot 96 is triggered as illustrated in FIG. 8(E).

The one-shot 76 is triggered when the A input makes a high to low transition while at the same time the B input is high. This occurs at the beginning of each data pulse as illustrated in FIG. 8. The inverted Q output of the one-shot 70 makes the high to low transition at the beginning of each data pulse. At the beginning of each data pulse, the B input illustrated by FIG. 8(E) is high. The inverted Q output of the one-shot 76 goes low for approximately one microsecond when the one-shot 76 is triggered as illustrated in FIG. 8(F).

The flip-flop 104 is preset by the inverted Q output of the one-shot 76. Thus, the data output 106 is set high whenever there is a data pulse between clock pulses.

The Q output of the one-shot 96 is fed to the A input of the one-shot 108. The one-shot 108 is triggered on the high to low transition of the A input. The Q output will go high for approximately 4.7 microseconds, and the inverted Q output likewise will go low for approximately 4.7 microseconds when the one-shot 108 is triggered. Thus, the one-shot 108 provides clock signals having a 4.7 microseconds delay from the clock signal 102.

Referring to FIG. 4, the serial to parallel converter 22 receives the clock signal 102 and a data signal 106. The serial to parallel converter chips 150 and 152 are initially set by the clear signal 68 so that all data outputs are zero. Each clock pulse of the clock signal 102 will cause the data output signal 154 to match the data signal 106. Also, each clock pulse will cause the data outputs to shift, i.e. the data output signal 156 assumes the value of the data output signal 154, the data output 158 assumes the value of the data output 156, etc. The data output 162 is fed to the data input of the serial to parallel converter 152 and causes the data output 164 to match the value of the data input for each clock pulse of the clock signal 102.

The data outputs from the serial parallel converter chips 150 and 152 are fed to the latches 170 and 172 of the data bus interface 26. The latches 170 and 172 are enabled after every eigth clock signal by the latch enable signal 174 generated by the control logic 30. The outputs of the latches 170 and 172 represent a byte of data and are read onto the data bus 36 when the buffers 176 abd 178 are enabled. The buffers 176 and 178 are enabled by the load data signal 182 from the control logic 30.

The control computer 16 reads the data available signal 186 by enabling the buffer 180 via the set data available signal 184 until the data available signal 186 indicates that the latches 170 and 172 have latched a byte of data. The control computer 16 then sends the appropriate address code to the control logic 30 to cause it to generate the load data signal 182. In this manner, the control computer 16 continuously samples the data available signal 186 until a byte of data is ready and then reads the data by enabling the buffers 176 and 178. Referring to FIG. 5, the program to run the cassette tape recorder interface 14 is stored in the EPROM 200. The EPROM 200 is addressed by address lines zero through nine of the address bus 32. The address lines 10 through 15 and the read signal are decoded by the NAND gates 202, 206, 208, and the decoder 204. The output of the decoder 204 then enables the buffers 210 and 212 so that the program can be read from the EPROM 200.

Each program stored on the cassette tape is formatted to begin with 256 zeros followed by hexodecimal code A5. Referring to FIG. 4, the comparators 188 and 190 of the program start detector 28 are set to generate the start signal 192 when the hexodecimal code A5 is read.

Referring to FIG. 6, the control logic 30 receives address codes from the address bus 32, the clock signals 114 and 116, and the start signal 192. The address codes from the address bus 32 are decoded by the decoder 250 which enables one of the five outputs. The A output is the load data signal 182 which causes a byte of data stored on the cassette tape to be read into the computer 16. The B output of the decoder 250 causes the clear signal 68 to be set. The C output of the decoder 250 causes the clear signal 68 to be reset. The D output of the decoder 250 is the set data available signal 184 which allows the computer 16 to read and data available signal 186.

The counter 280 of the control logic 30 counts pulses of the clock signal 114 and generates an output after every 8 pulses.

The Q output of flip-flop 278 will be high when it is preset by the E output of the decoder 254 when the start signal 192 is high. The flip-flop 278 is reset by the clear signal 68. Once the Q output of the flip-flop 278 is set high, it may only be set low by the clear signal 68 since the inverted Q output is low, which causes the output of the AND gate 276 to be low.

The Q output of the flip-flop 278 is connected to an input of the AND gate 284. The other input to the AND gate 284 is high after every eighth clock pulse. The output of the AND gate 284 is the latch enable signal 174 which causes the latches 170 and 172 to latch the data outputs of the serial to parallel converters 150 and 152. The latch enable signal 174 also sets the data available signal 186.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A cassette tape recorder interface for receiving electrical signals from a cassette tape played on a cassette tape recorder adapted to have the play head engaged while in the fast forward wind mode, comprising in combination:

a connector means for receiving electrical signals from an output of a cassette tape recorder;

a comparator means responsive to said electrical signals from said cassette tape recorder for comparing the magnitude of said electrical signals with a predetermined reference level, and generating data and clock pulses in response to those of said electrical signals which exceed said reference level, at a baud rate exceeding 8,000, whereby high speed data transfer may be accomplished with substantial rejection of noise;

a separator means responsive to said data and clock pulses for generating a separate data signal and clock signal;

a serial to parallel converter means responsive to said data signal and said clock signal for generating parallel data signals;

a data bus interface responsive to control signals for transmitting said parallel data signals;

a control means for generating said control signals;

a program start detector means responsive to said parallel data signals for detecting the start of a program stored on said cassette tape and enabling the transmission of said parallel data signals by said data bus interface, whereby the data bus interface will not transmit said parallel data signals until the start of a program is detected;

an address bus, comprising a plurality of address signals, connected to the control means and to a computer; and an interface program memory means comprising nonvolatile memory connected to the address bus for providing a plurality of pre-programmed program instructions to the computer via a data bus in response to address signals from the computer, with the control means being responsive to address signals transmitted on said address bus by said computer in response to said program instructions provided to the computer from the memory means via said data bus;

whereby parallel data signals are generated and transmitted in response to electrical signals received from the cassette tape recorded at high speed, and in accordance with pre-programmed instructions contained in the interface program memory means.

2. The cassette tape recorder interface of claim 1 wherein:

the control means further comprises a means for generating a clear signal in response to said address signals for clearing the separator means and the serial to parallel converter means.

3. The cassette tape recorder interface of claim 2 wherein:

the separator means comprises a first one-shot device responsive to said data and clock pulses generated by the comparator means, an AND gate having a first input connected to a first output of the first one-shot device, a second one-shot device responsive to a single output of said AND gate, a third one-shot device responsive to a single utilized output of the second one-shot device and having a single utilized output connected to a second input of said AND gate, a fourth one-shot device responsive to said single utilized output of the second one-shot device, a fifth one-shot device responsive to a first output of the fourth one-shot device and to a second output of the first one-shot device, and a flip-flop responsive to said first output of the first one-shot device, to said first output of the fourth one-shot device, and to a single utilized output of the fifth one-shot device, whereby a single output of the flip-flop provides said data signal, and a second output of the fourth one-shot device provides said clock signal.

4. The cassette tape recorder interface of claim 3 wherein:

the separator means further comprises a sixth one-shot device responsive to said first output of the fourth one-shot device for generating delayed clock signals.

5. The cassette tape recorder interface of claim 4 wherein:

the separator means further comprises a seventh one-shot device responsive to said data and clock pulses generated by the comparator means; and the first one-shot device is responsive to a single utilized output of the seventh one-shot device, with the first one-shot device responsive to data and clock pulses generated by the comparator means indirectly through the seventh one-shot device, whereby said seventh one-shot device buffers said data and clock pulses.

6. The cassette tape recorder interface of claim 5 wherein:
said seventh one-shot device and said flip-flop are responsive to said clear signal.

7. The cassette tape recorder interface of claim 6 wherein:
the comparator means comprises a voltage comparator.

8. The cassette tape recorder interface of claim 7 wherein:
the memory means includes a decoder connected to said address bus, read only memory connected to said address bus, buffer means having inputs connected to outputs of said read only memory and outputs connected to said data bus and responsive to an output of said decoder whereby the outputs of the read only memory are transmitted onto said data bus when said buffers are enabled by said output of said decoder.

9. The cassette tape recorder interface of claim 8 wherein:
said read only memory is programmable.

* * * * *